United States Patent
Steinhauser et al.

(10) Patent No.: US 6,699,156 B2
(45) Date of Patent: Mar. 2, 2004

(54) METHOD FOR CONTROLLING A TRANSMISSION OF A VEHICLE

(75) Inventors: Klaus Steinhauser, Kressbronn (DE); Christian Popp, Kressbronn (DE); Hansjörg Rosi, Meckenbeuren (DE)

(73) Assignee: ZF Friedrichshafen AG, Friedrichshafen (DE)

(*) Notice: Subject to any disclaimer, the term of this patent is extended or adjusted under 35 U.S.C. 154(b) by 72 days.

(21) Appl. No.: 10/008,248

(22) Filed: Nov. 8, 2001

(65) Prior Publication Data
US 2002/0058570 A1 May 16, 2002

(30) Foreign Application Priority Data
Nov. 15, 2000 (DE) .......................... 100 56 578

(51) Int. Cl.⁷ ............................................. F16H 61/08
(52) U.S. Cl. ........................ 477/148; 477/143; 477/154
(58) Field of Search .................... 477/143, 148, 477/154; 701/58, 59

(56) References Cited

U.S. PATENT DOCUMENTS

| | | | | |
|---|---|---|---|---|
| 4,742,461 A | * | 5/1988 | Eschrich et al. | 701/58 |
| 5,072,390 A | * | 12/1991 | Lentz et al. | 701/60 |
| 5,079,972 A | * | 1/1992 | Iizuka | 477/143 |
| 5,168,449 A | * | 12/1992 | Benford | 477/146 |
| 5,547,437 A | * | 8/1996 | Kamada et al. | 477/143 |
| 6,080,084 A | * | 6/2000 | Yasue et al. | 477/154 |
| 6,095,948 A | | 8/2000 | Depping et al. | 477/143 |
| 6,134,496 A | | 10/2000 | Rotter et al. | 701/56 |

FOREIGN PATENT DOCUMENTS

| | | | |
|---|---|---|---|
| DE | 195 31 675 A1 | 3/1997 | F16H/59/46 |
| DE | 196 38 077 C1 | 12/1997 | F16H/61/06 |
| DE | 199 17 575 A1 | 10/2000 | F16H/61/04 |

\* cited by examiner

Primary Examiner—Charles A Marmor
Assistant Examiner—Dennis Abdelnour
(74) Attorney, Agent, or Firm—Davis & Bujold, PLLC

(57) ABSTRACT

Described is a method for the control of a transmission of a motor vehicle, especially an automatic transmission, with hydraulically activated shifting elements. The shifting elements are shifted to engage or disengage by means of specified pressure pattern ($p_{kab}$, $p_{kzu}$) which have been input into an electronic control unit. In the said method, an applied pressure ($p_{kab}$) on a disengaged shifting element, by the release of a force flow generated by a holding pressure ($p_{kab-h}$) is reduced to a shift pressure ($p_{kab-sd}$) and a transmission input speed of rotation ($n_t$) experiences a change dependent upon the applied pressure ($p_{kab}$) on a disengaged shifting element. An adaption of the pressure pattern ($p_{kab}$) of a disengaged shifting element is dependent upon the deviation of an actual release time ($T_{LZ-T}$) of the change of the transmission input speed of rotation from a specified release time ($T_{LZ}$) of the transmission input speed of rotation, and is designed in such a manner that, the change in speed of rotation of the transmission input speed of rotation ($n_t$), occurs at a shifting at the preset release time ($T_{LZ}$) or in a window of time incorporating that same preset release time ($T_{LZ}$).

13 Claims, 2 Drawing Sheets

METHOD FOR CONTROLLING A TRANSMISSION OF A VEHICLE

FIELD OF THE INVENTION

The invention concerns a method for the control of a transmission of a motor vehicle.

BACKGROUND OF THE INVENTION

A common procedure for shifting the gear ratio in an automatic clutch is the method referred to as "overrun shifting". In this method, a first clutch, which is initially in the engaged state, is opened, that is, is driven into the disengage state, under the control of a first specified pattern of control pressures. Simultaneously, or nearly so a second clutch, which is initially in the disengaged stated, is driven towards the engaged state, and more specifically into a slipping condition that just precedes the fully engaged state a second specified pattern of control pressures. The pressure patterns controlling the clutches involved in the shifting operation are determined and controlled by an electronic control unit and are applied to the clutches by electromagnetic positioning devices.

In overrun shifting the control pressure applied to the initially disengaged clutch is initially reduced by a holding pressure that is dependent upon the fluid filling of the initially engaged clutch and to a shift-pressure level that places the initially disengaged clutch into the slipping condition. Because of the lessening of the clutch control pressure to the shift-pressure level, the power transfer capability of the disengaged clutch is continuously reduced and the input speed of rotation of the transmission correspondingly begins to deviate to an increasing degree from the synchronous input speed of rotation of the preceding actual gear ratio, that is, from the synchronous input speed of rotation in the "old" gear position.

The time at which the transmission input rotational speed deviates from the synchronous transmission input rotational speed of the preceding gear ratio is designated as the "release time" of the clutches and represents the instant at which the driver subjectively makes a change in the driving conditions of the motor vehicle, specifically, a shift in the gear ratio of the transmission. An example of such is the sequence of operations following a "kick-down", wherein the control pressure applied to the disengaged clutch is reduced, accompanied by a reduction in a take-off drive moment, followed by the actual gear shift into the desired new gear ratio. In this example, the synchronization of the transmission input rotational speed is initiated by the increasing power transfer capability of the engaged clutch.

The "quality" of the shifting process may be increased for the period following the release time by control of the gradient in the transmission input rotational speed, which is dependent upon the control pressure applied to the initially disengaged clutch, so as to provide a time span during which the input rotational speed may approach the synchronous input rotational speed for the new transmission ratio.

Increasing requests for improved quality of shifting and for increased spontaneity in shifting has increased the demands on the shifting control mechanisms, such as the software controlling an automatic transmission. The general approach taken to meet these increased requirements is to move the "release time" of the transmission input speed of rotation closer to the beginning of each shift operation.

The method of reducing the interval between the initiation of a shift operation and the "release time" of the transmission input speed has inherent problems, however. For example, the release time often wanders away from the selected time as a result of tolerances, scattering, and further negative influences, such as, for instance, frictional values which change their characteristics during the time of operation, and./or ongoing component wear. As a result, ease of shifting becomes poorer and the spontaneity of operation of the automatic transmission by the driver is impaired. Although there have been efforts to maintain a constant release time for the transmission input speed of rotation, nearly all of the solutions that have been considered have significant associated costs in labor and money, and none have provided satisfactory results.

Thus, it is the purpose of the present invention to provide a method by with which the release time of an automatic transmission can be adjusted over the life time of the automatic transmission, so that the release time occurs as nearly as possible at the beginning of a shifting operation and at a constant specified time.

SUMMARY OF THE INVENTION

In accordance with the invention, this purpose is achieved with a method for the control of a transmission of a motor vehicle following the principles of this invention.

According to the present invention, the pattern of control pressures applied to an initially disengaged shifting element may be adapted in a manner dependent upon the deviation between a specified transmission release time and an actual transmission release time so that the actual release time for a given shift operation can be held constant during the entire operational life of the transmission and so that the change in transmission input rotational speed occurs at the specified release time or within a period that includes the specified release time.

The transmission release time can be made to occur at the start of a shift operation, thereby permitting a high degree of spontaneity in shifting by the driver and an increased quality of shifting operation. Also, scattering and tolerance degradation cause by the wear of transmission components which would negatively effect the transmission shifting operations can be specifically compensated for over the operational life of the transmission.

Moreover, in the case of multiple gear changes, that is, in the event of a sequence of gear changes as a single operation, the synchronous release time of a shifting element of a each shifting operation can be adjusted to the actual synchronous time of a shifting element of the preceding shifting operation. As a result, the dead time before the increase in transmission input rotational speed in each shift operation after the first shift operation will be reduced and the sequential increases in transmission input rotational speed with appear to a driver to be continuous.

BRIEF DESCRIPTION OF THE DRAWINGS

The invention will now be described, by way of example, with reference to the accompanying drawings in which.

DETAILED DESCRIPTION OF THE INVENTION

Figure 1:
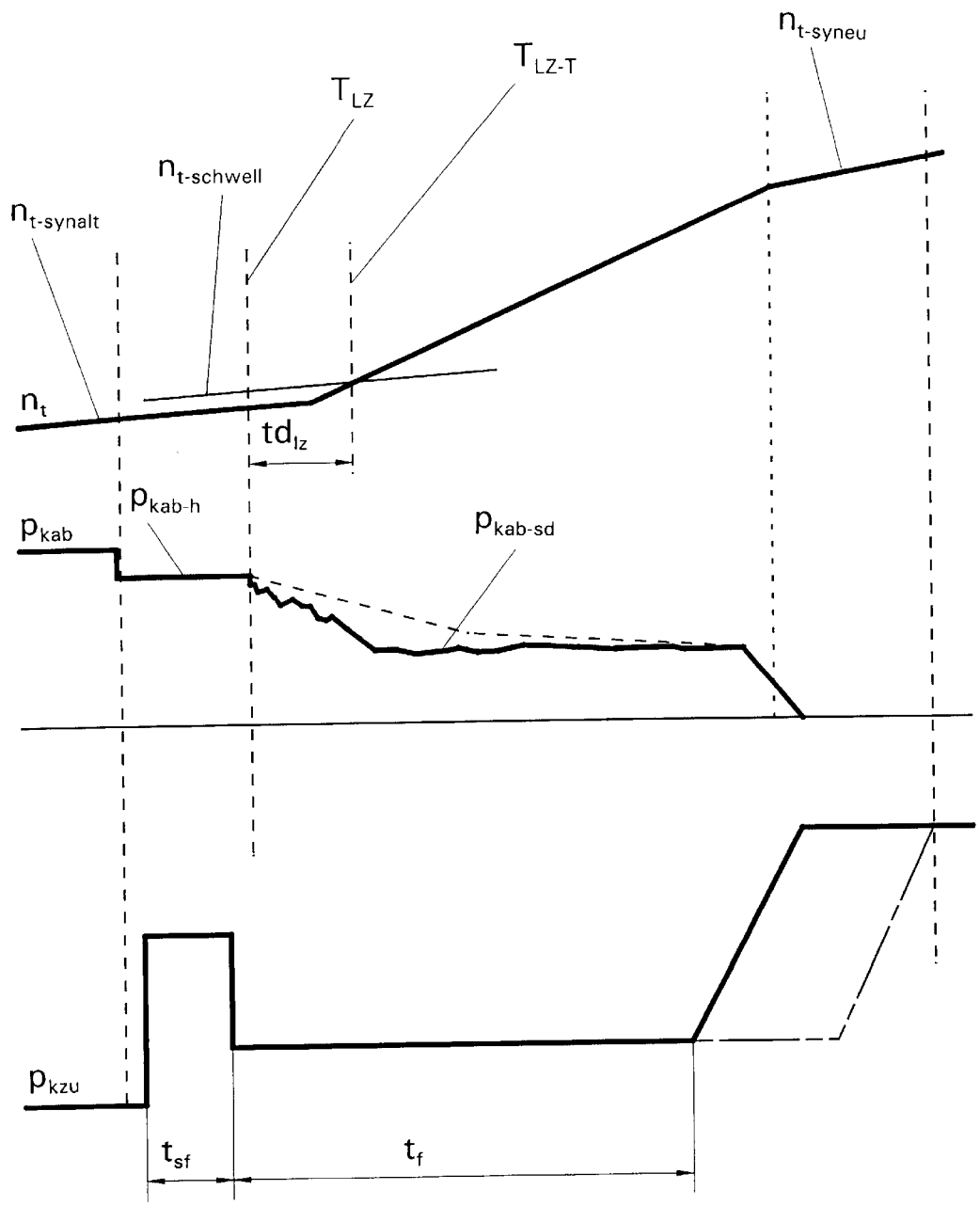
FIG. 1 a simplified set of mutually corresponding, qualitative curves of the speed of rotation of a transmission with plotted pressure relations of a disengaged clutch as well as the pressure relations of an engaged clutch, and FIG. 2 a program flow chart of an adaption-routine in accord with the invention.

The curves of FIG. 1, represent the speed of rotation $n_t$ of a transmission input, which, in this case is also the speed of rotation of a converter driving the transmission input, a pattern of the control pressure $p_{kab}$ applied to an initially disengaged shift element, this being, for instance, a disengaged clutch, and as well a pattern of the control pressure $p_{kzu}$ applied to an initially engaged switching element, this being, for instance, a engaged clutch. These named components relate to a method for the control of an automatic transmission wherein the pattern of control pressure $p_{kab}$ applied to the disengaged clutch is adapted to be dependent upon a deviation between an actual release time $T_{LZ-T}$ and a specified release time $T_{LZ}$ of the speed of rotation $n_t$ of the transmission input so designed, so that the change in speed of rotation $n_t$ of the transmission input, that is, the actual release time $T_{LZ-T}$ is made to occur simultaneously with a gear change (shift) at the specified, preset release time $T_{LZ}$.

The shifting elements are designed as hydraulically activated clutches, which, in the case of gear shifting, are shifted open or closed by means of an electronic control apparatus which regulates the patterns of control pressure applied to the clutches, as shown by the curve $p_{kab}$ of control pressure for the initially disengaged clutch and the curve $p_{kzu}$ of control pressure for the initially engaged clutch. As shown, at the start of a gear shifting operation the control pressure $p_{kab}$ of the initially disengaged clutch is initially reduced from an initial pressure value which is higher than a holding pressure value $p_{kab-h}$ to a holding pressure value $p_{kab-h}$ which is sufficient to hold the clutch in the disengaged state, and then, starting from a specified release time $T_{LZ}$, decreases toward a shift-pressure value $p_{kab-sd}$. As indicated, the input speed of rotation $n_t$ of the transmission is dependent on the pressure $p_{kab}$ exerted on the disengaged coupling, and the change in the control pressure $p_{kab}$ results in a change in the input speed of rotation $n_t$ of the transmission.

The pre-set, specified release time $T_{LZ}$, occurs after the start of a reduction of the control pressure $p_{kab}$ from the holding pressure $p_{kab-h}$ to a shift pressure $p_{kab-d}$. According to the adaptation process of present invention, the time of a shift is determined during period in which the control pressure $p_{kab}$ is being reduce as being the actual release time $T_{LZ-T}$, wherein the actual release time $T_{LZ-T}$ is the time at which the transmission input speed of rotation $n_t$, that is, the synchronized speed $n_{t-synalt}$ corresponding to the last selected gear, has exceeded a threshold value $n_{t-schwell}$ of $n_t$.

The transmission input speed of rotation $n_t$ will exceed the threshold value $n_{t-schwell}$ at an actual release time $T_{LZ-T}$ time that occurs along the characteristic synchronous speed of rotation $n_{t-synalt}$ line of the actual selected gear and after the expected release time $T_{LZ}$, and the threshold value $n_{t-schwell}$, or limit, appears as a series of values along a straight line, parallel to the curve of the speed of rotation $n_t$ of the transmission input.

The numerical quantity of the threshold value $n_{t-schwell}$ is determined in accordance with the desired sensitiveness of the adaption process to gear shifts and with consideration of the transmission shifting characteristics desired for the driving conditions at the time. As a result, this quantity can lie, advantageously, in a range of from 10 r.p.m. to 50 r.p.m. above the synchronized speed $n_{t-synalt}$ corresponding to the last selected gear. Obviously, it is a matter for the judgement of the expert if this limit is to be set above the range stated herein.

Referring again to FIG. 1, when the control pressure $p_{kab}$ imposed on the disengaged clutch reaches a defined shift-pressure $p_{kab-sd}$, the transmission input speed of rotation $n_t$ begins to increase towards a synchronized speed of rotation $n_{t-syneu}$ of the newly new selected gear ratio of the transmission. The actual release time $T_{LZ-T}$, is thereby determined by the intersection of the straight line defined by threshold values $n_{t-schwell}$ with the upwardly sloping line defined by the increasing the speed of rotation $n_t$ of the transmission input.

In order to execute a down shift in a transmission gear ratio by means of an overrunning shifting, it is necessary to fill the initially disengaged clutch, which is to become engaged during the shifting operation, in a quick-fill phase $t_{sf}$ before the clutch is brought into engagement with the transmission power train. The quick-fill phase $t_{sf}$ is followed by a filling-compensation phase $t_f$ that is executed so that the clutch has reach a selected speed of rotation and has achieved the necessary power transmission capacity before the transmission has reached synchronized speed of rotation $n_{t-syneu}$ of the "new" gear ratio. At this point the transmission has been synchronized for the new gear ratio.

For this reason, the control pressure $p_{kab}$ applied to the initially disengaged clutch is maintained at the holding pressure $p_{kab-h}$ to maintain the input speed of rotation $n_t$ of the transmission at the synchronized speed of rotation $n_{tsynalt}$ of the "old" gear ratio and only after the run-out of the quick-fill phase $t_{sf}$ is the control pressure $p_{kab}$ reduced to the shift-pressure $p_{kab-sd}$.

The control of the shift-pressure $p_{kab-sd}$ applied to the disengaged clutch results in a simultaneous control of the gradient of the of the input speed of rotation $n_t$ of the transmission. This control in turn allows the input speed of rotation $n_t$ of the transmission to be raised to the synchronized speed of rotation $n_{t-syneu}$ of the "new" gear selection at a selected time.

Figure 2:
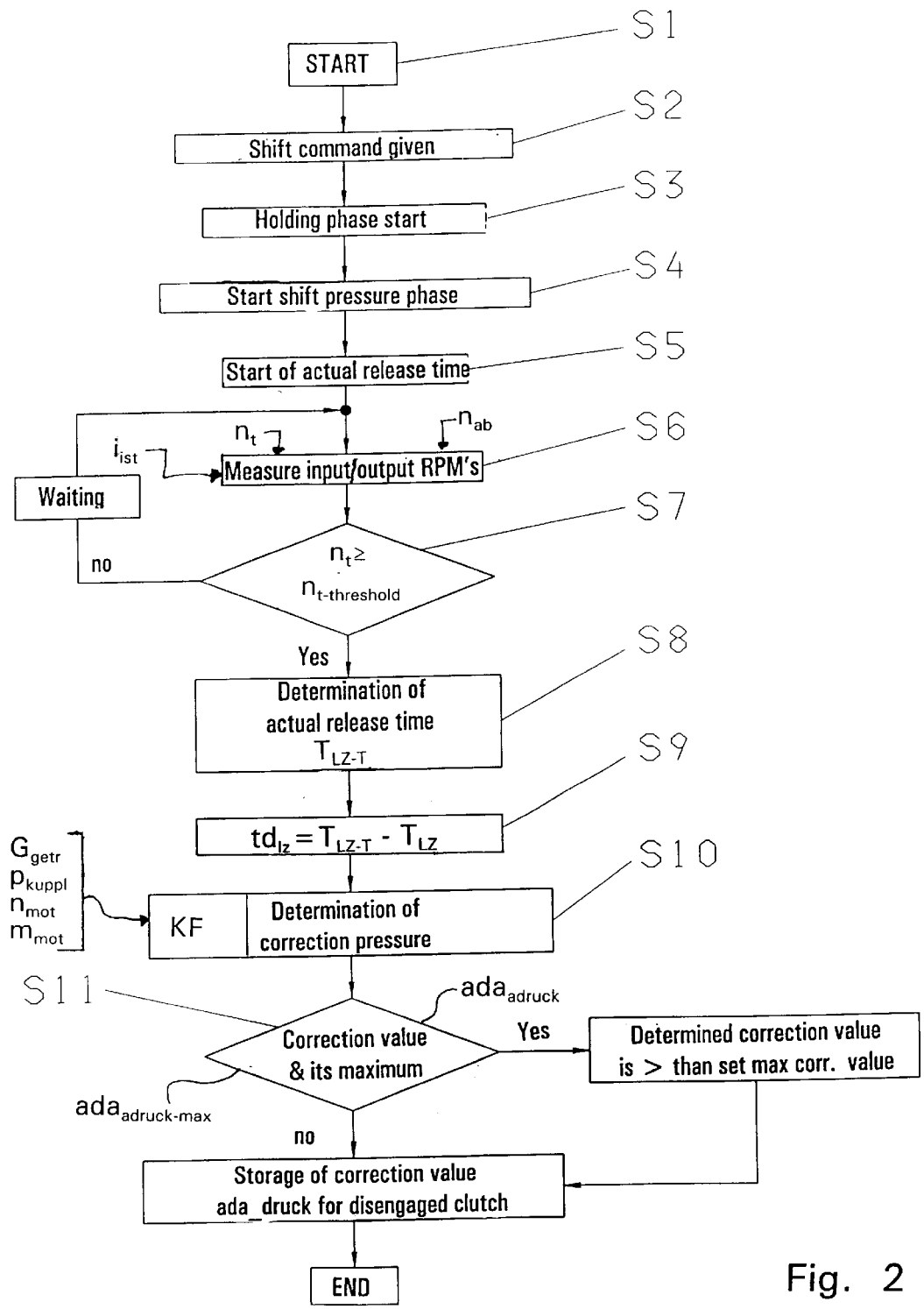

In FIG. 2 is presented a Program Flow Chart of an adaption routine for acquiring a constant release time $T_{LZ}$ of the speed of rotation $n_t$ of the transmission wherein the adaption routine begins at a first step. In a second step S2, a test is carried out to detect whether or not a shift-command has been issued from the electronic control unit of the automatic transmission. In the case of a positive reply, that is, that a shift command has been issued a holding phase is initiated in Step 3 in which the control pressure $p_{kab}$ applied on the disengaged clutch is lowered to the holding pressure $p_{kab-h}$ by means of an offset to the control pressure $p_{kab}$ and the control pressure $p_{kab}$ maintained at that holding pressure $p_{kab-h}$ for a specified period of time.

A shift-pressure phase is started in Step 4 in which the control pressure $p_{kab}$ applied to the disengaged clutch is decreased to the shift-pressure $p_{kab-sd}$. In this shift-pressure phase, the gradient of the speed of rotation $n_t$ of the transmission is controlled by controlling the control pressure $p_{kab}$ applied to the disengaged clutch. As illustrated, the control pressure $p_{kab}$ applied to the disengaged clutch follows the curve of shift-pressure $p_{kab-sd}$, which is shown in FIG. 1 as a wavy line.

Monitoring of the actual release time $T_{LZ-T}$ begins in a Step 5, which begins at the start of the shift-pressure phase. In Step S6 the input speed of rotation $n_t$ of the transmission and an output speed of rotation $n_{ab}$ of the transmission are measured. The output speed of rotation $n_{ab}$ is provided as an input into a computation of a transmission input speed of rotation, is the transmission speed of rotation for the actual gear ratio $i_{ist}$ of the transmission. The threshold value $n_{t-schwell}$ of the input speed of rotation $n_t$ of the transmission is then determined from the calculated speed of rotation of the transmission, wherein the threshold value $n_{t-schwell}$ is determined as greater than the calculated speed of rotation of the transmission by a selected offset value. As described, the threshold value $n_{t\text{-}schwell}$ determines the true release time LLZ-T as a function of the threshold value $n_{t\text{-}schwell}$ and the actual input rotational speed of the transmission.

In step S7 the input speed of rotation $n_t$ of the transmission is compared with the threshold value $n_{t\text{-}schwell}$. If the input speed of rotation is greater than the threshold value, the process continues to Step S8 wherein the actual release time $T_{LZ\text{-}T}$ is determined for use as a reference value for the adaption of the control pressure $p_{kab}$ of the disengaged clutch.

If the comparison in Step S7 indicates that the input speed of rotation $n_t$ of the transmission is less than the threshold $n_{t\text{-}schwell}$ the process returns to Step S6, with an intervening dwell period, that is, an intervening delay period. The input speed of rotation $n_t$ and the output speed of rotation $n_{ab}$ are again measured and compared, and so on, with the loop between Steps S6 and S7 being repeated until the criterion of Step 7 is fulfilled, or a break-off limit, such as a maximum number of loopings, is reached.

In other embodiments of the invention, and instead of employing the threshold value $n_{t\text{-}schwell}$ for the determination of the actual release time, an applicable threshold may be determined base upon an acceleration impulse, a speed of rotation gradient, or a measured difference between the speeds of rotation of the shifting elements.

The actual release time $T_{LZ\text{-}T}$ that is determined by the adaption process is in turn employed in determining a correction value $ada_{druck}$ that is applied to the shift-pressure pkab-sd. In a Step 9, the value of a deviation $td_{lz}$ of the known, actual release time $T_{LZ\text{-}T}$ from the specified release time $T_{LZ}$ is computed. In a Step S10 an adaption value is calculated by means of a specified characteristic line stored in the electronic control unit, wherein the adaption value is based upon the deviation $td_{lz}$ of the already determined release time $T_{LZ\text{-}T}$ from the specified release time $T_{LZ}$. The specified release time $T_{LZ}$, as an example, can be fed into the transmission control, as a characteristics map KF=f ($C_{getr}$, $m_{mot}$, $n_{mot}$, $p_{kuppl}$, ...).

In other embodiments, Moreover, the possibility exists, of determining the correction value $ada_{druck}$ may be determined from a characteristics map as a function of the deviation of the already determined actual release time from the specified release time $T_{LZ}$, wherein the characteristics map represents a function of the most distinctive operational parameters of the automatic transmission, such as the operational parameters of the disengaged clutch. One or more values of operational parameters such as, transmission temperature $C_{getr}$, clutch pressure $p_{kuppl}$, motor speed of rotation $n_{mot}$, motor torque $m_{mot}$, may be incorporated into the characteristics map.

In the present embodiment of the invention, the adaption value will be added or subtracted to/from correction values retained in an adaption memory storage. In a Step S11 the absolute value of the correction value $ada_{druck}$ is compared to a specified maximum correction value $ada_{druck\text{-}max}$.

If the evaluation of the Step 11 shows that the absolute value of the determined correction value $ada_{druck}$ is greater than the specified maximum correction value $ada_{druck\text{-}max}$, then the specified maximum correction value $ada_{druck\text{-}max}$ will be selected and stored in the adaption memory as the correction value $ada_{druck}$ for use in the adaption of the control pressure $p_{kab}$ of the disengaged clutch in place of the determined correction value $ada_{druck}$, the specified maximum correction value $ada_{druck\text{-}max}$ will be given and input into the adaption memory. The adaption process then terminates.

The examination of the determined correction value $ada_{druck}$ is also used for the purpose of monitoring plausibility of the adaption, especially in the case of a system with some run-in time, that is, a system with an extensive operating time history. For example, in such a system a one-time "drop-out" because of extraordinary operational situations in the automatic transmission will not to be taken into consideration in the evaluation.

If the actual release time $T_{LZ\text{-}T}$ of the expired shifting occurs before the specified release time $T_{LZ}$, the shift-pressure $p_{kab\text{-}sd}$ of a later shifting is increased by the amount of the correction value $ada_{druck}$.

If, however, by means of the above described adaption, an actual release time $T_{LZ\text{-}T}$ occurs after the specified release time $T_{LZ}$, the shift-pressure $p_{kab\text{-}sd}$ for a later shifting is decreased by the amount of the correction value $ada_{druck}$, that is, by the computed adaption value.

As is apparent from the above discussion, the adaption of the control pressure curve $p_{kab}$ of the disengaged clutch is realized by means of a change in the shift-pressure $p_{kab\text{-}sd}$ of the disengaged clutch. That is, since the holding pressure $p_{kab\text{-}h}$ is related to the shift-pressure $p_{kab\text{-}sd}$, then the change of the shift-pressure $p_{kab\text{-}sd}$ of the disengaged clutch can invoke a corresponding change of the holding pressure $p_{kab\text{-}h}$ of the disengaged clutch.

In another embodiment of the invention, the control pressure $p_{kab}$ of the disengaged may be made dependent upon the deviation of the actual release time $T_{LZ\text{-}T}$ of the transmission input speed of rotation $n_t$ from the specified release time $T_{LZ}$ so that the change of the transmission input speed of rotation $n_t$ upon a shifting within an applicable window of time will occur at a specified release time $T_{LZ}$.

The goal of the adaption method of the present invention is thereby to adjust the release time of the speed of rotation $n_t$ of the transmission to occur as closely as possible to the time at which the control pressure $p_{kab}$ of the disengaged clutch is reduced from the holding pressure $p_{kabph}$ to the shift-pressure $p_{kab\text{-}sd}$, which is the beginning of the shifting procedure.

| Reference Numbers | |
|---|---|
| $ada_{druck}$ | Correction value |
| $ada_{druck\text{-}max}$ | Maximum correction value |
| $c_{tr\text{-}getr}$ | Transmission temperature |
| $i_{ist\text{-}gear}$ | Actual gear ratio of transmission |
| $m_{mot}$ | Motor Torque |
| $n_{mot}$ | RPM of motor |
| $n_{ab}$ | RPM of output shaft |
| $n_t$ | RPM of turbine wheel |
| $n_{t\text{-}schwell}$ | Set threshold value (turbine) |
| $n_{t\text{-}syn\text{-}alt}$ | Synchronized RPM of turbine wheel of a current real set ratio in the automatic transmission |
| $n_{t\text{-}syn\text{-}new}$ | Synchronized RPM of turbine wheel in targeted gear ratio |
| $p_{kab}$ | Pressure run of a disengaged shift element |
| $p_{kzu}$ | Pressure run of an engaged shift element |
| $p_{kab\text{-}sd}$ | Shift pressure of a disengaged shift element |
| $p_{kab\text{-}h}$ | Holding pressure |
| $p_{kuppl}$ | Clutch pressure |
| $td_{lz}$ | Deviation of the actual release time from the specified set time |
| $t_f$ | Complete compensation phase of the engaged clutch |
| $t_{sf}$ | Quick full phase of the engaging clutch |
| $T_{LZ}$ | Specified release time |
| $T_{LZ\text{-}T}$ | Actual release time. |
| S1 to S11 | Step of the adaption routine |

What is claimed is:
1. A method for the control of a transmission of a motor vehicle with hydraulically activated shifting elements which are shifted into engagement or disengagement by means of a pattern of pressure ($p_{kab}$, $p_{kzu}$) which is preset into an electronic control unit, wherein a pressure ($p_{kab}$) applied to a disengaged shifting element by the release of a flow of force from a holding pressure ($p_{kab-h}$) is reduced to a shift-pressure ($p_{kab-sd}$) and a transmission input speed of rotation ($n_t$), which is dependent upon the pressure ($p_{kab}$) applied to a disengaged shifting element, is subjected to a change, wherein an adaption of the pressure pattern ($p_{kab}$) of a disengaged shifting element, dependent upon a deviation of an actual release time ($T_{LZ-T}$) from a specified release time ($T_{LZ}$), wherein an actual release time ($T_{LZ-T}$) is determined as that time of a shifting operation at which a measured change in the input speed of rotation ($n_t$) resulting from an actual release of the disengaged element due to the reduction of the holding pressure ($p_{kab-h}$) to the shift-pressure ($p_{kab-sd}$) oversteps a preset threshold, and wherein the adaptation is so designed that the speed of rotation change of the transmission input speed of rotation ($n_t$) can occur at a given shifting at the said specified release time ($T_{LZ}$).

2. The method according to claim 1, wherein an adaption of the pressure pattern ($p_{kab}$) of a disengaged shifting element, dependent upon a deviation of an actual release time ($T_{LZ-T}$) of the transmission input speed of rotation ($n_t$) from a specified release time ($T_{LZ}$) of the transmission drive input speed of rotation is so designed, that the speed of rotation change of the transmission input speed of rotation ($n_t$) does occur upon a given gear shifting at the said specified release time ($T_{LZ}$).

3. The method according to claim 1, wherein the preset release time ($T_{LZ}$) occurs after a beginning of the reduction of the disengaged shifting element pressure ($p_{kab}$) to the shift-pressure ($p_{kab-sd}$) by means of the holding pressure ($p_{kab-h}$).

4. The method according to claim 3, wherein by means of the adaption of the pressure pattern ($p_{kab}$) of a disengaged shifting element, the holding pressure ($p_{kab-h}$) of the disengaged shifting element is changed.

5. The method according to claim 4, wherein characterized, in that the change of the holding pressure ($p_{kab-h}$) is carried out dependent upon the change of the shift-pressure ($p_{kab-sd}$).

6. The method according to claim 1, wherein as an actual release time ($T_{LZ-T}$), the time of a shifting is determined to be that time at which the transmission input speed of rotation ($n_t$), based on a pattern of a synchronized speed of rotation ($n_{t-syn-alt}$) of the transmission input speed of rotation of an actual operating gear ratio of the transmission, oversteps a specified threshold value ($n_{t-schwell}$).

7. The method according to claim 1, wherein as an actual release time ($T_{LZ-T}$) the time of a shifting operation is determined as that time at which an acceleration surge of the motor vehicle exceeds a preset threshold.

8. The method according to claim 1, wherein by means of an adaption of the pressure pattern ($p_{kab}$) of a disengaged shifting element, the shift-pressure ($p_{kab-sd}$) is changed.

9. The method according to claim 8, wherein the shift-pressure ($p_{kab-sd}$) is increased for a later shifting operation by a correction value ($ada_{druck}$), if the actual release time ($T_{LZ-T}$) of the evaluated shifting occurs before the preset release time ($T_{LZ}$).

10. The method according to claim 8, wherein the shift-pressure ($p_{kab-sd}$) is diminished by a correction value ($ada_{druck}$) for a later shifting operation, if the actual release time ($T_{LZ-T}$) of the evaluated shifting occurs after the preset release time ($T_{LZ}$).

11. The method according to claim 1, wherein characterized, in that, upon the transition to the shift pressure ($p_{kab-sd}$) a regulation of the gradient of the transmission input speed of rotation ($n_t$) is effected as dependent upon the pressure ($p_{kab}$) which is exerted on the disengaged shifting element.

12. A method for the control of a transmission of a motor vehicle with hydraulically activated shifting elements which are shifted into engagement or disengagement by means of a pattern of pressure ($p_{kab}$, $p_{kzu}$) which is preset into an electronic control unit, wherein a pressure ($p_{kab}$) applied to a disengaged shifting element by the release of a flow of force from a holding pressure ($p_{kab-h}$) is reduced to a shift-pressure ($p_{kab-sd}$) and a transmission input speed of rotation ($n_t$), which is dependent upon the pressure ($p_{kab}$) applied to a disengaged shifting element, is subjected to a change, wherein an adaption of the pressure pattern ($p_{kab}$) of a disengaged shifting element, dependent upon a deviation of an actual release time ($T_{LZ-T}$) from a specified release time ($T_{LZ}$), is so designed, that the speed of rotation change of the transmission input speed of rotation ($n_t$) can occur at a given shifting at the said specified release time ($T_{LZ}$), wherein an actual release time ($T_{LZ-T}$) is determined as that time of a shifting operation at which a gradient of the transmission input speed of rotation ($n_t$) resulting from an actual release of the disengaged element due to the reduction of the holding pressure ($p_{kab-h}$) to the shift-pressure ($p_{kab-sd}$) oversteps a preset threshold.

13. A method for the control of a transmission of a motor vehicle with hydraulically activated shifting elements which are shifted into engagement or disengagement by means of a pattern of pressure ($p_{kab}$, $p_{kzu}$) which is preset into an electronic control unit, wherein a pressure ($p_{kab}$) applied to a disengaged shifting element by the release of a flow of force from a holding pressure ($p_{kab-h}$) is reduced to a shift-pressure ($p_{kab-sd}$) and a transmission input speed of rotation ($n_t$), which is dependent upon the pressure ($p_{kab}$) applied to a disengaged shifting element, is subjected to a change, wherein an adaption of the pressure pattern ($p_{kab}$) of a disengaged shifting element, dependent upon a deviation of an actual release time ($T_{LZ-T}$) from a specified release time ($T_{LZ}$), is so designed, that the speed of rotation change of the transmission input speed of rotation ($n_t$) can occur at a given shifting at the said specified release time ($T_{LZ}$), wherein an actual release time ($T_{LZ-T}$) is determined as that time of a shifting operation at which a measured change in speed of rotation at the disengaged shifting element resulting from an actual release of the disengaged element due to the reduction of the holding pressure ($p_{kab-h}$) to the shift-pressure ($p_{kab-sd}$) oversteps a preset threshold.

* * * * *